Patented Dec. 29, 1953

2,664,449

UNITED STATES PATENT OFFICE 2,664,449

PYROLYSIS OF TRIFLUOROCHLORO-
ETHYLENE POLYMERS

William T. Miller, Ithaca, N. Y., assignor to the
United States of America as represented by the
United States Atomic Energy Commission No Drawing. Application January 6, 1947,
Serial No. 720,478

4 Claims. (Cl. 260—653)

The present invention relates to the preparation of perhalocarbons by a method including thermal cracking. Perhalocarbons, considered as chemical entities, may be defined as compounds consisting exclusively of carbon and halogen, with any degree of saturation. However, perhalocarbons, when commercially prepared, may contain as an impurity groupings of other elements, in an amount less than 2% based on the weight of sample. Such an impurity is derived from a promoter, solvent medium or other materials utilized in carrying out the synthesis but not ordinarily desired in the final products, as more fully explained below.

This application is in part a continuation of my application Serial Number 601,387, filed June 25, 1945.

An object of the invention is to provide a method for preparing perhalocarbons of low and intermediate molecular weights.

Another object of the invention is to provide a method for preparing perhalocarbon oil compositions.

Another object of the invention is to prepare certain new perfluorocarbons of low molecular weight.

A specific object of the invention is to provide an improved process for preparing chemically stable fluorine-containing perhalocarbon oils from low molecular weight fluorine-containing perhalo-olefins.

Another specific object of the invention is to provide a method for the preparation of low molecular weight fluorine-containing perhalo-olefins from perhalocarbon polymers.

The above and other objects will become apparent in the course of the following description and will be pointed out more particularly in the claims.

The perhalocarbons comprise a relatively new class of compounds that possess wide commercial utility by reason of their unique chemical and physical properties. As in the case of the hydrocarbons, the lower members of the series are gases at ordinary temperatures, the intermediate members are liquids and with advancing molecular weights the compounds pass through the ranges of greases, waxes and up to high melting solids. The perhalocarbons of principal interest are those in which the halogen is principally in the form of fluorine, the most useful members of the class known at the present time being the perfluorocarbons and the perfluorochlorocarbons.

It has been proposed to make perhalocarbons by starting with a hydrocarbon of the desired carbon skeleton and replacing the hydrogen with the selected halogen by suitable chemical process. This process is subject to limitations in that certain of the perhalocarbons are difficult to make by this method and some of the reactions are difficult to control. It has also been proposed to make the members of the perhalocarbon series by polymerizing unsaturated low molecular weight perhalocarbons. This polymerization can be accomplished in a variety of ways some of which are disclosed in my application Serial Number 601,387, filed June 25, 1945. In general, these polymerization methods involve the processing of the unsaturated perhalocarbons or a mixture of perhalocarbons in the presence of a polymerization promoter and under suitably selected conditions of pressure, temperature and time. The polymerization reactions produce a series of compounds ranging from simple dimers to long chain high molecular weight polymers. The polymers produced in this way are essentially multiples of the monomer so that it is in general not possible to obtain compounds with a molecular weight that is not a multiple of the molecular weight of the monomer. Furthermore, in conducting a polymerization process to produce a composition with a relatively narrow range of molecular weights, the yield of the desired fraction is generally low due to the fact that with high conversions of monomer a substantial portion of the product has a molecular weight outside the limits of the range desired.

In accordance with the present invention, fluorine-containing perhalocarbons are prepared by a method which includes obtaining a fluorine-containing perhalocarbon of a molecular weight greater than that desired in the final product and reducing that molecular weight by thermally cracking the compound. The starting material can be made by any of the processes referred to above or by other suitable means. The perhalocarbons in which the halogen is fluorine or a mixture of fluorine and chlorine undergo cracking of the carbon-carbon bonds when heated, to an extent depending upon the particular member of the series being treated. The extent to which the cracking occurs and the size of the fragments formed can be controlled to a considerable extent by controlling the factors of temperature and time. Thus, where the cracking is performed under conditions which expose the starting materials and the cracking products to cracking temperatures for relatively long times the first formed cracking products which are mostly of relatively high molecular weight undergo further decomposition. Under such conditions it is normally to be expected that the products will consist largely of very low molecular weight materials, including a large proportion of the monomer in instances where the material cracked is of the polymerized type. Reaction under these conditions is valuable as a means for recovering unsaturated low molecular weight perhalocarbons which may be used either in further polymerizations or for any other desired purpose. Cracking under these conditions also produces low molecular weight materials which may be difficult to synthesize by other means. Care must be taken, however, to avoid retaining monomers which undergo rapid secondary thermal reactions too long in the reaction zone. Ordinarily the high volatility of these materials facilitates their rapid removal.

If instead of using operating conditions which retain the reactants and early cracking products in the cracking zone for prolonged periods, conditions are selected which favor the removal of the early products of the reaction from the zone, the products obtained will be more largely of intermediate molecular weights. That is, their molecular weights will lie between that of the starting material and that of the ultimate smallest member of the series. By controlling the reaction in this way it is practicable to produce compositions in the oil range from perhalocarbons lying in the grease to solid range. In the preparation of perhalocarbon oils by the polymerization process, after the oil fraction has been isolated by distillation, solvent extraction or the like, there remains a substantial portion of over-polymerized material. By the method of this invention, this rejected material can be cracked to yield a substantial further quantity of oil, thus raising the overall efficiency of the process.

A specific feature of the invention resides in the discovery that in the preparation by the polymerization method of perhalocarbon oils of the type in which the halogen is fluorine or a mixture of fluorine and chlorine with the fluorine predominating, substantial improvements in facility of production and, in some cases, in yields of desired fraction, are obtained where the polymerization is deliberately carried to a point beyond that at which the greatest quantity of oil is produced and thereafter the polymerization product is subjected to carefully controlled cracking to yield oil. There is a specific advantage in using the cracking process where the polymer is formed in the presence of a promoter and/or a reactive solvent containing hydrogen. In such polymerizations the polymer contains end groupings derived from the promoter and the solvent and for maximum stability the hydrogen of such end groupings must be replaced, preferably with fluorine. The cracking of the polymer to an oil fraction breaks the carbon chain and thus produces shorter chain material without increasing the number of hydrogen containing end groupings. Therefore, by first polymerizing to an average molecular weight above the oil range and thereafter cracking to produce oil, the number of hydrogen containing end groupings is lower than the number produced where the oil is obtained directly through polymerization. The oil produced by cracking is more readily stabilized since the unsaturation produced by cracking is more reactive than residual hydrogen towards halogenating agents and the completeness of saturation may be readily tested, an important consideration in the control of large scale production.

In cracking high molecular weight perhalocarbons some products will be obtained that contain double bonds, particularly when the cracking is extensive and the product lies mainly in the low molecular weight range. Where the products are intended for further chemical reaction this is a desirable effect. Where, however, the compounds are to be used under circumstances requiring high chemical stability, it is necessary to saturate these double bonds. This may be done most advantageously by halogenation; when the greatest stability is desired, fluorination is preferred. Halogenation can be accomplished by treating the products with the free halogen or with active halogenating agents such as the higher valence metal halides such as cobalt trifluoride and silver difluoride.

As another feature of the invention it has been found that the thermal cracking process can be performed under conditions which minimize the production of unsaturated compounds if, at the time of cracking, the halocarbon is in contact with fluorine or an active fluorinating agent. While this fluorinating treatment does not completely prevent the formation of unsaturated compounds in all cases, it greatly reduces the quantity formed and thereby reduces the amount of stabilization by fluorination or otherwise that is required after cracking.

As a corollary feature of the invention it has been found that fluorine-containing perhalocarbons of cyclic structure including saturated compounds, may be thermally cracked to yield products of open-chain structure which may be of the same or lower molecular weight than the starting compound.

There are essentially two general methods for carrying out the process, namely, the pot still method and the hot tube method. In the pot still method the perhalocarbon to be cracked is placed in the cracking zone of the apparatus, in one batch or in increments, and only volatile products are removed from the zone. Control of time of exposure of the cracking products to the cracking heat is accomplished in the pot still method by regulating the rate of removal of the products in gaseous phase, as by altering the pressure in the still, by sweeping the reaction zone with gas, or the like. In the hot tube method the perhalocarbon to be cracked is forced through a cracking zone at a controlled rate. The hot tube method is most readily controllable where the perhalocarbon to be cracked can be processed in the gaseous state but by the use of gravity or positive mechanical feeding devices of known types, liquid or solid materials can be handled. It is the preferred procedure for handling materials which distill at below cracking temperatures at atmospheric pressure although higher cracking pressures may be utilized to extend the range of the pot still type of apparatus. The hot tube method provides means for limiting the time of exposure of both the starting material and its cracking products to the cracking heat. The means for rapidly removing volatile cracking products, described in connection with the pot still method, can also be advantageously used in some cases in the hot tube method.

In operating the cracking process, the reaction zone is raised to a temperature sufficiently high to split a carbon-carbon bond of the perhalocarbon to be cracked and the time of exposure of the starting material and its cracking products to the cracking heat is controlled to favor the desired product or products. Cracking to give low molecular weight material, e. g. to obtain perhaloethylene monomers from polymers thereof, is favored by temperatures appreciably in excess of minimum cracking temperatures and by arranging conditions so that intermediate molecular weight material remains in or is returned to the reaction zone for further breakdown. It should be noted that rapid removal of monomer products from the reaction zone is essential where a maximum yield of monomer is desired since the perhalogen monomers undergo polymerization and other reactions under the influence of heat. The hot tube method is normally the preferred procedure for cracking to produce monomer. Temperatures reached are not dependent upon the boiling range of products and the contact times can be controlled by the rate of feed and dimensions of apparatus. Intermediate molecular weight fractions between the desired products and feed stock may be recycled in a continuous manner if desired. The rapid removal of monomer products is facilitated by reducing the pressure or by utilizing an inert sweep gas. Cracking to accomplish a moderate reduction in molecular weight, e. g. to obtain perhalocarbon oil compositions from waxy to solid perhalocarbon is favored by moderate cracking temperatures and removal of desired products before they are reduced further in molecular weight. The pot still method is generally the preferred procedure for the production of oils and waxes where the boiling range of the products desired permits cracking temperatures to be reached at moderate pressures with continuous removal of the desired products by distillation. Cracking under reduced pressure is especially favorable to the recovery of low molecular weight perhaloolefins as by-products from the production of oils.

The following examples illustrate several specific methods by which the invention can be practiced, but it is to be understood that the method is susceptible to variation within the scope of the invention.

*Example 1*

The perhalogenated olefin $CF_2=CFCl$ was polymerized at 60° C. for 65 hours in a closed vessel containing only the olefin and a small amount of benzoyl peroxide as catalyst. This procedure produced a solid polymer of relatively high molecular weight having a melting point of 195–199° C. The total polymeric material produced by this method was cracked in a glass distillation apparatus at 21 mm. pressure at approximately 370° C. and yielded 77.7% of crude cracked material condensable in an air cooled trap. The crude was then distilled at 0.3 mm. pressure and yielded 58.5% (based on weight of crude) oil boiling at 120° to 230° C. The overall yield of desired oil fraction was therefore approximately 45.5% based on the total weight of polymeric material produced.

For comparison, representative yields of oil produced by the straight oil process, which involves direct ploymerization only, are approximately 25% based on the total weight of polymeric material produced. This 25% does not include the yield of oil which may be obtained by cracking the high molecular weight residues from the straight oil process to increase the yield.

The polymer used in the experiment described in Example 1 is but one of a large number of similar materials which may be cracked to yield lower molecular weight fractions of organic halogenides. Thus polymers produced from other monomers, e. g. $CF_2=CF_2$, $CF_2=CF-CF=CF_2$, polymers of the same monomers produced under different conditions, and copolymers of mixtures of such monomers may be cracked to yield the intermediate and low molecular weight materials. In general, the cracking conditions are preferably varied depending on the polymer to be thermally decomposed. For example, high molecular weight polymers of tetrafluoroethylene ($CF_2=CF_2$) require appreciably higher temperatures for cracking than the polymers of trifluorochloroethylene.

High molecular weight polymers of trifluorochloroethylene were cracked at temperatures of from about 300° to about 500° C. High molecular weight polymers of tetrafluoroethylene were cracked at temperatures in the range of from about 400° to about 650° C.

The following examples illustrate thermal cracking generally as well as thermal cracking accompanied by procedures for saturating the products with fluorine, some being taken from my application, Serial Number 601,387 referred to above.

*Example 2*

In the thermal depolymerization of polytetrafluoroethylene $(C_2F_4)_n$, seven grams of polytetrafluoroethylene were heated in an air bath which was heated with a free Bunsen flame. A solid sublimate, 1.6 g., was collected in an ice trap and liquid distillate, about 1 cc., was collected in a trap cooled with solid carbon dioxide. The liquid distillate was washed with KOH solution to yield 2.0 g. product (dried). This fraction boiled from −29° C. to +50° C. and had an average molecular weight of 178.

*Example 3*

For this depolymerization in presence of cobaltic trifluoride, seven grams of polytetrafluoroethylene and 6.1 g. of $CoF_3$ were heated as indicated above to decomposition. Solid sublimate, 0.7 g., and liquid distillate, about 1 cc., were collected. The liquid distillate was washed with aqueous KOH and dried (1.9 g.); it was found to have a molecular weight of 185.

*Example 4*

For the depolymerization in the presence of elementary fluorine, elementary fluorine 0.02 mole was passed over 8.0 g. of polytetrafluoroethylene in a nickel tube at a temperature ranging from 450° to 620° C. About 1 cc. of liquid was collected in a Dry Ice cooled trap.

Similarly, 0.05 mole fluorine was passed over 5 g. of polytetrafluoroethylene at 420° to 440° C. About 1 cc. of liquid product was collected, B. P. −10° to +40° C., after washing with alkali and drying.

*Example 5*

The pyrolysis of a high molecular weight tetrafluoroethylene polymer was carried out at approximately 535° C. and 269 mm. pressure in a lead bath heated distilling flask. The decomposition at this temperature was relatively slow; product started to come off after about 3 hours and continued to come off for about 16 hours. The less volatile products were collected at room temperature and the more volatile lower molecular weight compounds were condensed in solid carbon dioxide and in liquid nitrogen traps. Of the material distilled, over 22% was collected as a white waxy solid in the air trap and 78% was collected in the cold traps. The material in the cold traps was chlorinated and distilled and fractions were recovered which on the basis of observed properties were believed to consist principally of compounds as given below:

| Fraction | Boiling range | Average molecular weight observed | Principal compound | Molecular weight calculated |
|---|---|---|---|---|
| 1 | −5° to 0° | 205.5 | $CF_2CF_2CF_2CF_2$ (perfluorocyclobutane). | 200 |
| 2 | 0° to 8° | 180 | $CF_2Cl—CF_2Cl$ (chlorinated product of tetrafluoroethylene). | 171 |
| 3 | 33° to 35° | 216 | $CF_3—CFCl—CF_2Cl$ (chlorinated product of perfluoropropene). | 221 |
| 4 | 60° to 67° | 267 | $C_4F_6Cl_2$ (chlorinated product of unsaturated material of formula $C_4F_6$). | 271 |
| 5 | >67° | | | |

The air trap solid was quite similar to paraffin in general appearance. It had a long melting point range (indicating a mixture of a variety of molecular weight products) starting at 120° C. while at 280° some solid phase still remained.

Example 6

To attain thermal depolymerization of polytrifluorochloroethylene, trifluorochloroethylene was polymerized in chloroform solution at 100° C. with benzoyl peroxide. After removal of an oil fraction B. P. to about 240° C. at 0.2 to 0.3 mm. of pressure, a solid residue remained. This residue was thermally cracked as indicated below.

Trifluorochloroethylene polymer (see above) 33.2 g. was heated in a distilling flask for one half hour at 360° C. (bath temp.). A liquid distillate, 4.3 g. B. P. 180° to 230° C., was collected. This distillate was unsaturated.

Similarly 31.9 g. of acetone-insoluble polymeric trifluorochloroethylene was heated from 360° to 450° C. A water cooled receiver collected 18.3 g. and 9.9 g. was collected in a Dry Ice cooled receiver. The low boiling material was largely trifluorochloroethylene.

Example 7

The oil fractions produced according to Example 1 or Example 6 above were stabilized by the following procedure.

A portion of the oil was placed in a nickel reactor equipped with a slow speed mechanical agitator and mixed with half its weight of cobalt trifluoride at room temperature. The temperature was slowly raised to 150° C. while continuing the agitation and was held at that temperature for one-half hour. The mixture was then cooled to 100° C. and further quantity of cobalt trifluoride, equal to one-half the weight of the oil fraction, was added and mixed in. The temperature of the mixture was then slowly raised to 175° C. and held there for one-half hour, raised to 200° C. for one and one-half hours and finally to 225° C. for two hours.

The reaction mixture was a stiff paste at room temperature. The oil was recovered by extraction with three 1 liter portions of boiling trichlorotrifluoroethane per pound of oil charged. The residual cobalt salts were suitable for reconversion to cobalt trifluoride by suitable fluorinating means. The trichlorotrifluoroethane was recovered by distillation and volatile matter was removed from the residue to a boiling point of 70° C. at 0.25 mm. mercury. The oil so obtained was clear white and free pouring at room temperature.

The oils produced according to the invention are useful as lubricants, sealant liquids, heat exchanging liquids, hydraulic fluids, extractants, liquids for use in the gravity classification of solids, etc.

Example 8

1,2-dichloroperfluorocyclobutane

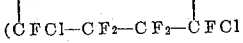

$(CFCl—CF_2—CF_2—CFCl$ boiling range 59.0 to 60.5° C.) was thermally depolymerized in a nickel tube at about 560° C. Among the products obtained was trifluorochloroethylene ($CF_2=CFCl$) identified by its boiling point and by its conversion on chlorination to trifluorotrichloroethene ($CF_2Cl—CFCl_2$). The yield was approximately 10%. The products included a small yield of perhalocarbons of three carbon atoms and 3-4-dichloroperfluorobutene-1 ($CF_2=CFCFClCF_2Cl$).

This example illustrates the cracking of a saturated, cyclic compound. In this instance a monomer is produced from a dimer, and may be used for further polymerizations or for any other desired purpose.

Example 9

1,2-dichloroperfluorocyclobutane was thermally cracked in the presence of $Cl_2$ in a glass tube at approximately 590° C., 293 grams of the perhalocarbon and 195 grams of chlorine being passed through the hot tube. About 130 grams of the product obtained was $CF_2ClCFCl_2$ (B. P. 48). Other products boiling from below −20° C. to 175° C. were also obtained. The yield of compounds of four carbon atoms was less than 20 grams.

Example 10

Perfluorocyclobutane, prepared by dimerizing tetrafluoroethylene in the vapor phase in a nickel reactor tube at temperatures of from 400 to 600° C., was cracked in the same tube at a temperature of from 650° to 750° C. to produce perfluoropropene ($CF_3CF=CF_2$), an unsaturated material of the formula $C_4F_8$ which on the basis of various observations was believed to consist primarily of perfluorobutene-1, $CF_3—CF_2CF=CF_2$ P. P. 4.8° C.,764 average molecular weight 202, and tetrafluoroethylene.

This example illustrates the preparation of an olefinic compound, perfluoropropene, which may be used for polymerization or other reactions. The example also illustrates cracking to recover a compound with a carbon chain different from that of the monomer, tetrafluoroethylene, used in making the material that was cracked in addition to recovering the monomer. The perfluoropropene formed in this process has a boiling point of about −25° C. at atmospheric pressure and forms a dibromide, a new compound, with a boiling point of 72.0 to 72.5° C. A molecular weight determination checked with the calculated weight of 150 for $C_3F_6$. Perfluoropropene was also produced from 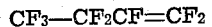 $CF_2=CFCF_2Cl$ (3-chloroperfluoropropene-1) by reaction with SbF₅. CF₂=CFCF₂Cl was added slowly to an excess of SbF₅ in a reaction flask fitted with a low temperature distilling column and a mechanical stirrer and heated gently. The CF₂=CFCF₃ B. P. −25° C. was removed by fractionation as formed and converted to the dibromide, a new compound B. P. 72.0–72.5° C. Similarly CF₂=CFCFCl₂ (3,3-dichloroperfluoropropene-1), may be reacted to form CF₂=CFCF₂Cl and CF₂=CFCF₃. SbCl₅ and anhydrous HF may also be utilized for these indirect fluorinations.

*Example 11*

Trifluorotrichloroethane (CF₂Cl—CFCl₂, B. P. 47.3–47.6° C.) was cracked in a nickel tube at about 700° C. Dry nitrogen gas was passed through the liquid compound and the nitrogen, carrying vapor of the compound, was passed through the tube. The time of heat treatment was about 7 seconds. The reaction products contained trichlorofluoromethane, CFCl₃, identified by its boiling point, in a yield between 10 and 20%. This example illustrates the cracking of a perhalocarbon of two carbon atoms.

*Example 12*

3-Chloroperfluoropropene-1 (CF₂=CF—CF₂Cl) was thermally cracked in a nickel tube at 600° C. The perhalocarbon was passed through the hot tube and the time of heat treatment was about 7 seconds. Among the products obtained was trifluorochloroethylene (CF₂=CFCl), identified by its boiling point and by its conversion on chlorination to trifluorotrichloroethylene (CF₂Cl—CFCl₂)

The yield was 10%. The remainder of the product was chiefly unreacted feed material and a small amount of polymerization product of CF₂=CFCl.

*Example 13*

3-4-Dichloroperfluorobutene-1

(CF₂=CFCFClCF₂Cl)

a dimer of trifluorochloroethylene, was cracked at about 565° C. Among the products recovered was trifluorochloroethylene thus illustrating the depolymerization of the unsaturated dimer of trifluorochloroethylene.

*Example 14*

The unsaturated trimer (C₁₂F₁₈) of perfluorobutadiene (CF₂=CF—CF=CF₂), produced by copolymerization of perfluorobutadiene and its dimer (C₈F₁₂) in a bomb at 120°–200° C., was thermally depolymerized in a nickel tube at 520° C. The unsaturated trimer was passed through the hot nickel tube and the time of heat treatment was about 10 seconds. Among the depolymerization products obtained were perfluorocyclobutene

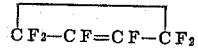

in approximately 15% yield and the dimer of perfluorobutadiene in approximately 20% yield. Polymers of perfluorobutadiene of higher molecular weight than the trimer may also be thermally cracked.

*Example 15*

The unsaturated dimer (C₈F₁₂) of perfluorobutadiene produced by polymerization of the latter in a bomb at 120°–200° C. was thermally depolymerized in a nickel tube at 520° C. Among the products obtained was perfluorocyclobutene

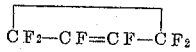

identified by its boiling point and by its very low melting point of −61° C. The yield of depolymerized product was approximately 5%.

The products of this and the preceding example are useful for further syntheses and when products of particular physical properties are desired.

Since many embodiments might be made of the present invention and since many changes might be made in the embodiment described, it is to be understood that the foregoing description is to be interpreted as illustrative only and not in a limiting sense.

I claim:
1. The process which comprises the steps of heating a normally solid polymer of trifluorochloroethylene having a melting point of less than about 200° C. in a reaction zone at a temperature of from about 300° C. to about 450° C. and sufficient to split a carbon-carbon bond to cause the pyrolysis of said polymer to products containing a major portion of materials of substantially higher molecular weight than the monomer, distilling said pyrolysis products from the reaction zone as formed, and collecting said pyrolysis products.

2. The process of claim 1 in which the pyrolysis product collected is fluorinated.

3. The process which comprises the steps of heating a normally solid polymer of trifluorochloroethylene having a melting point of less than about 200° C. in a reaction zone at a temperature of from about 300° C. to about 450° C. and sufficient to split a carbon-carbon bond to cause the pyrolysis of said polymer to products containing a major portion of material of substantially higher molecular weight than the monomer, maintaining said reaction zone at a reduced pressure, distilling said pyrolysis products from the reaction zone as formed, and collecting said pyrolysis products.

4. The process of claim 3 in which the pyrolysis product collected is an oil having a boiling range of about 120° C. to about 230° C. at about 0.3 mm. of Hg pressure.

WILLIAM T. MILLER.

References Cited in the file of this patent

UNITED STATES PATENTS

| Number | Name | Date |
|---|---|---|
| 2,384,821 | Downing et al. | Sept. 18, 1945 |
| 2,387,247 | Downing et al. | Sept. 18, 1945 |
| 2,394,581 | Benning et al. | Feb. 12, 1946 |
| 2,406,153 | Lewis | Aug. 20, 1946 |
| 2,420,222 | Benning et al. | May 6, 1947 |
| 2,497,046 | Kropa | Feb. 7, 1950 |